United States Patent [19]
Kobayashi et al.

[11] Patent Number: 5,744,760
[45] Date of Patent: Apr. 28, 1998

[54] COORDINATES INPUT APPARATUS

[75] Inventors: Katsuyuki Kobayashi, Yokohama; Atsushi Tanaka, Yamato; Yuichiro Yoshimura, Kamakura; Ryozo Yanagisawa, Inzai; Masaki Tokioka, Fujisawa; Hajime Sato, Yokohama, all of Japan

[73] Assignee: Canon Kabushiki Kaisha, Tokyo, Japan

[21] Appl. No.: 707,721

[22] Filed: Sep. 4, 1996

[30] Foreign Application Priority Data

Sep. 7, 1995 [JP] Japan ................................ 7-230023

[51] Int. Cl.$^6$ ............................................... G08C 21/00
[52] U.S. Cl. ................................................................. 178/19
[58] Field of Search ............................ 178/18, 19; 73/597

[56] References Cited

U.S. PATENT DOCUMENTS

| | | | |
|---|---|---|---|
| 3,790,709 | 2/1974 | Heywang | 178/18 |
| 3,806,642 | 4/1974 | Veith et al. | 178/18 |
| 3,808,364 | 4/1974 | Veith | 178/19 |
| 4,514,688 | 4/1985 | Whetstone | 178/18 |
| 4,931,965 | 6/1990 | Kaneko et al. | 178/18 |
| 4,991,148 | 2/1991 | Gilchrist | 178/18 |
| 5,054,005 | 10/1991 | Schorum | 178/18 |
| 5,484,967 | 1/1996 | Yanagisawa et al. | 178/19 |

FOREIGN PATENT DOCUMENTS 5-60615   9/1993   Japan.

*Primary Examiner*—Hezron E. Williams
*Assistant Examiner*—Rose M. Miller
*Attorney, Agent, or Firm*—Fitzpatrick, Cella, Harper & Scinto

[57] ABSTRACT

It is an object to provide a portable coordinates input apparatus which can be manufactured at low costs. An input pen applies a voltage to a desired position in a coordinate input area on a vibration propagating plate having a piezo-electric performance and having a first surface including the coordinate input area and a second area that faces the first surface. A vibration generated by the voltage is detected as an electric signal by a vibration detecting electrode arranged out of the coordinate input area.

7 Claims, 11 Drawing Sheets

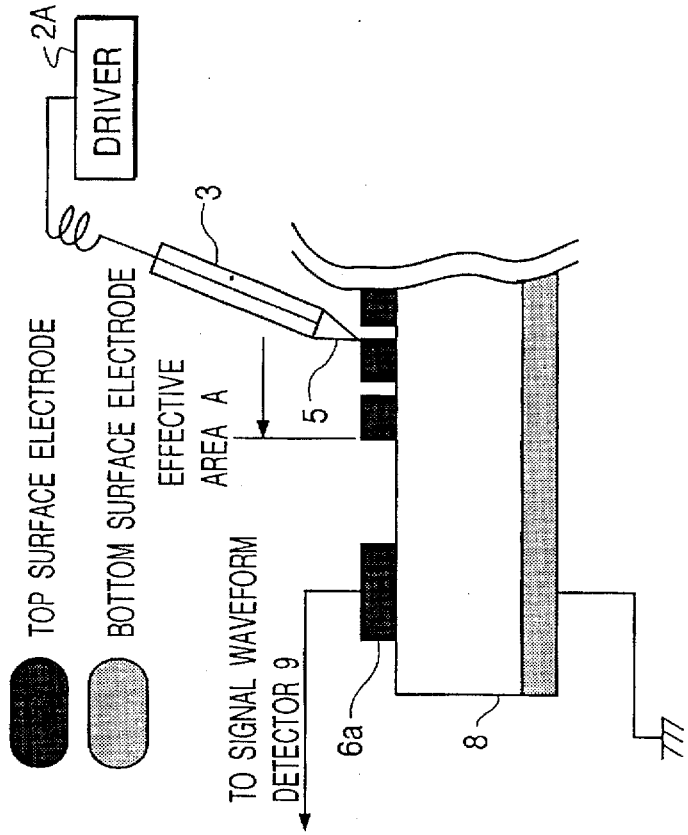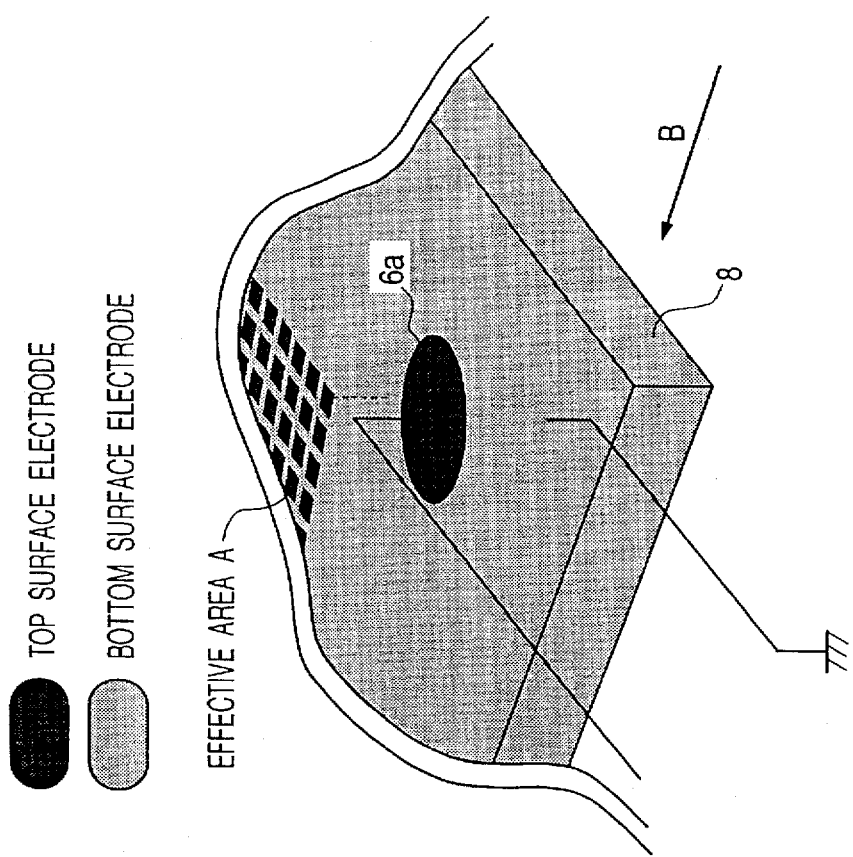

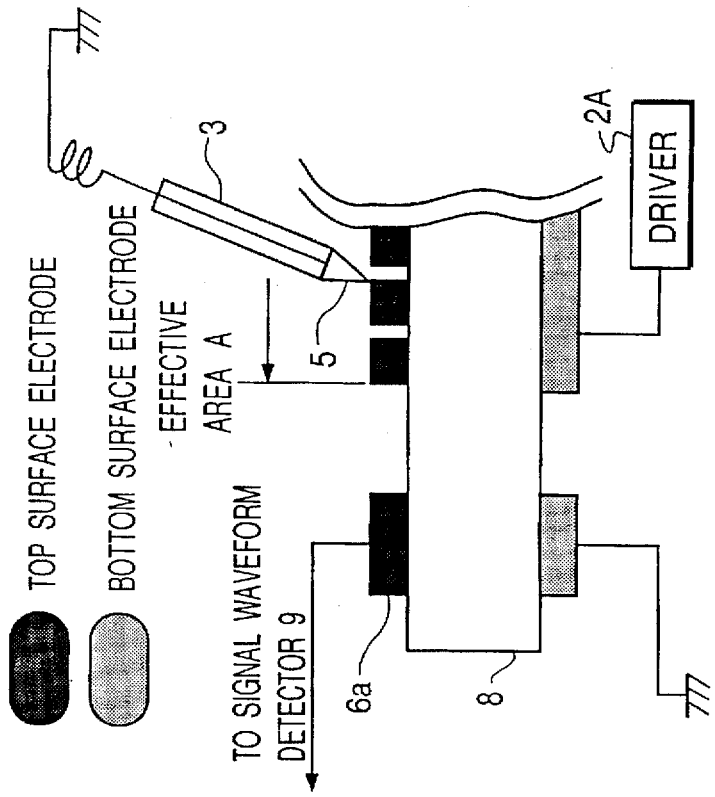
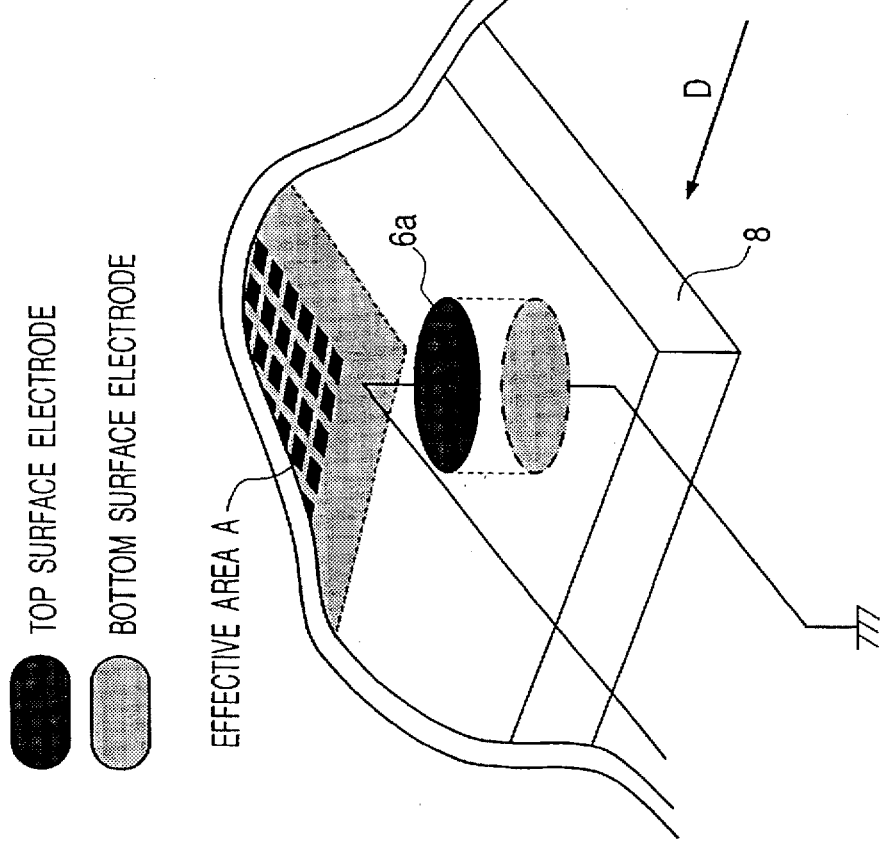

COORDINATES INPUT APPARATUS

BACKGROUND OF THE INVENTION

1. Field of the Invention

The invention relates to a coordinates input apparatus for inputting coordinates by an input pen.

2. Related Background Art

Hitherto, in a coordinates input apparatus disclosed in, for example, Japanese Patent Publication No. 5-60615, as shown in FIG. 11, a vibration such as a supersonic wave or the like which is generated by driving a vibrator 4 built in an input pen 3 by a drive signal which is inputted from a vibrator driver 2 is used, thereby calculating a distance L between a position instructed by a contact 5 of the input pen 3 and a piezoelectric sensor provided at an edge point of a vibration propagating plate 8. Specifically speaking, the vibration is inputted from the coordinate input pen 3 to the vibration propagating plate 8 serving as a coordinate input surface. The vibration is detected by a plurality of piezoelectric sensors attached to the vibration propagating plate 8. A time which is required until the vibration arrives at each sensor is measured by a signal waveform detector 9. On the basis of measured results, a coordinate position where the vibration was inputted is calculated by a controller 1. The coordinates of the position instructed by the input pen 3, for example, a character or a figure which was inputted can be outputted to an information processing apparatus such as a personal computer or the like.

However, the above conventional coordinates input apparatus has the following problems.

Since the conventional apparatus has a construction such that the vibration which is inputted from the input pen to the vibration propagating plate and propagates through the vibration propagating plate is detected by the plurality of piezoelectric sensors (vibration detecting devices) attached to the vibration propagating plate, there is a problem such that the apparatus itself is thick by an amount corresponding to a thickness of piezoelectric sensor and, for example, a portability when the apparatus is used as a portable type apparatus is low.

As a calculating principle of the position of the coordinates, the distance between the input point instructed by the input pen and each piezoelectric sensor is obtained and the position instructed by the input pen is outputted on the basis of the distance information. Therefore, in order to accurately calculate the coordinates, it is necessary to precisely position the absolute position of each piezoelectric sensor and to fix the piezoelectric sensors. For this purpose, it is necessary to strictly manage the positions of the piezoelectric sensors. There is a problem such that a productivity when producing a large number of apparatuses deteriorates and the apparatus cannot be manufactured at low costs due to such a low mass productivity.

The invention is made in consideration of the above problems and it is an object of the invention to provide a coordinates input apparatus having an excellent portability which can be manufactured at low costs.

SUMMARY OF THE INVENTION

According to an embodiment of the invention, there is provided a coordinates input apparatus for inputting coordinates by an input pen, comprising: a vibration propagating plate having a piezoelectric performance and having a first surface including a coordinate input area and a second surface that faces the first surface; applying means for applying a voltage to the vibration propagating plate by making the input pen come into contact with a desired position of the coordinate input area; and detecting means for detecting a vibration which is generated by the voltage as an electric signal at a position of an electrode which is arranged out of the coordinate input area.

BRIEF DESCRIPTION OF THE DRAWINGS

FIG. 3A is an external perspective view showing a second construction of a part of the vibration propagating plate 8;

FIG. 3B is a perspective view seen from the direction of an arrow B in FIG. 3A;

FIG. 5A is an external perspective view showing a fourth construction of a part of the vibration propagating plate 8;

FIG. 5B is a perspective view seen from the direction of an arrow D in FIG. 5A;

DETAILED DESCRIPTION OF THE PREFERRED EMBODIMENT

A preferred embodiment of the invention will now be described in detail hereinbelow with reference to the drawings.

A construction of a whole coordinates input apparatus in the embodiment will be first explained with reference to FIG. 1.

Figure 1:
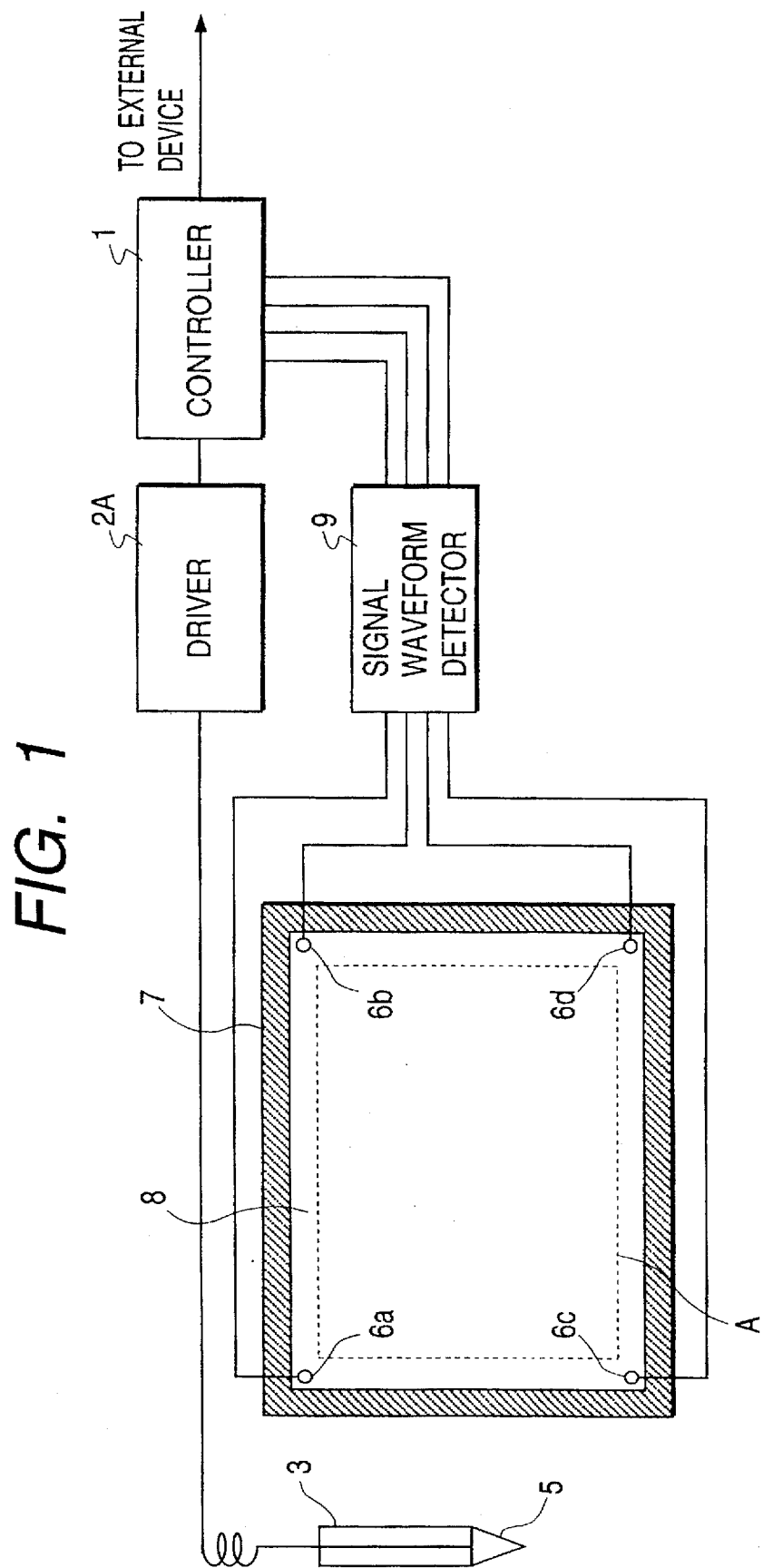
FIG. 1 is a block diagram showing a construction of a coordinates input apparatus according to an embodiment.

FIG. 1 is a block diagram showing a construction of the coordinates input apparatus of the embodiment.

Reference numeral 1 denotes the controller for controlling the whole coordinates input apparatus and for calculating coordinates; 2A a driver to form a drive signal for allowing the vibration propagating plate 8 to generate a vibration; and 3 the input pen whose tip is constructed by the conductive contact 5. By making the input pen 3 come into contact with the vibration propagating plate 8, which will be explained hereinlater, a voltage is applied to the direction of a thickness of vibration propagating plate 8, so that a vibration is generated from the vibration propagating plate 8 having a piezoelectric performance. Coordinates are inputted by designating the inside of an area A (hereinafter, referred to as an "effective area") surrounded by a broken line in the diagram by the input pen 3.

Reference numeral 8 denotes the vibration propagating plate. In the embodiment, the plate 8 is made of, for example, piezoelectric ceramics made of PZT (titanium lead zirconium). The vibration propagating plate 8 has a predetermined thickness and electrodes 6a to 6d for detection of a vibration each for converting a mechanical vibration into an electric signal are arranged at four corners of the top surface (coordinate input surface) of the plate 8. A specific structure will be described hereinlater with reference to FIGS. 2A to 5B. A damping material 7 to prevent (reduce) that the reflected vibration is returned to the center portion is provided around the outer periphery of the vibration propagating plate 8.

Processes which are executed by the coordinates input apparatus of the embodiment will now be described with reference to FIG. 1.

The mechanical vibrations which are detected by the electrodes 6a to 6d for detection of the vibration are converted into the electric signals and are, further, amplified by an amplifier (not shown). After that, the signals are inputted to the signal waveform detector 9. The electric signals inputted to the signal waveform detector 9 are subjected to waveform signal processes, which will be explained hereinlater, and signals indicative of timings when the vibration reaches the electrodes 6a to 6d are outputted to the controller 1. On the basis of the inputted signals, the controller 1 detects the vibration arrival times to the electrodes 6a to 6d, calculates distances between the input pen 3 and the electrodes 6a to 6d, and calculates coordinates by a method, which will be explained hereinlater. The detailed processing operations of the signal detector 9 and controller 1 will be separately described hereinlater.

The controller 1 can also output the calculated coordinate values to an external device (not shown) by a serial/parallel communication or the like.

On the other hand, the drive signal to vibrate the vibration propagating plate 8 is first supplied as a pulse signal (for example, every 5 msec.) at a low level from the controller 1 and starts the time counting operation by an internal timer (constructed by a counter). After the drive signal was amplified by the driver 2A at a predetermined gain, it is applied to the contact 5. When the contact 5 comes into contact with the inside of the effective area A of the vibration propagating plate 8, the electric drive signal is converted into a mechanical supersonic vibration. The vibration generated by the contact of the input pen 3 is delayed in accordance with the distance to each of the vibration detecting electrodes 6a to 6d and arrives.

A frequency of drive pulse which is formed by the driver 2A is selected so that the vibration generated by the vibration propagating plate 8 becomes a Lamb wave and propagates on the vibration propagating plate 8. Further, the elastic wave which propagates on the vibration propagating plate 8 is a Lamb wave and has an advantage such that it is difficult to be subjected to an influence by a scratch, an obstacle, or the like of the surface of the vibration propagating plate as compared with a surface wave or the like. It will be obviously understood that the vibration is not limited to such a wave but another vibrating mode can be also used in accordance with an object or an application.

A plurality of constructions of the vibration detecting electrodes 6a to 6d which are fixed onto the top surface of the vibration propagating plate 8 in the embodiment will now be described with reference to FIGS. 2A to 5B.

Figure 2B:
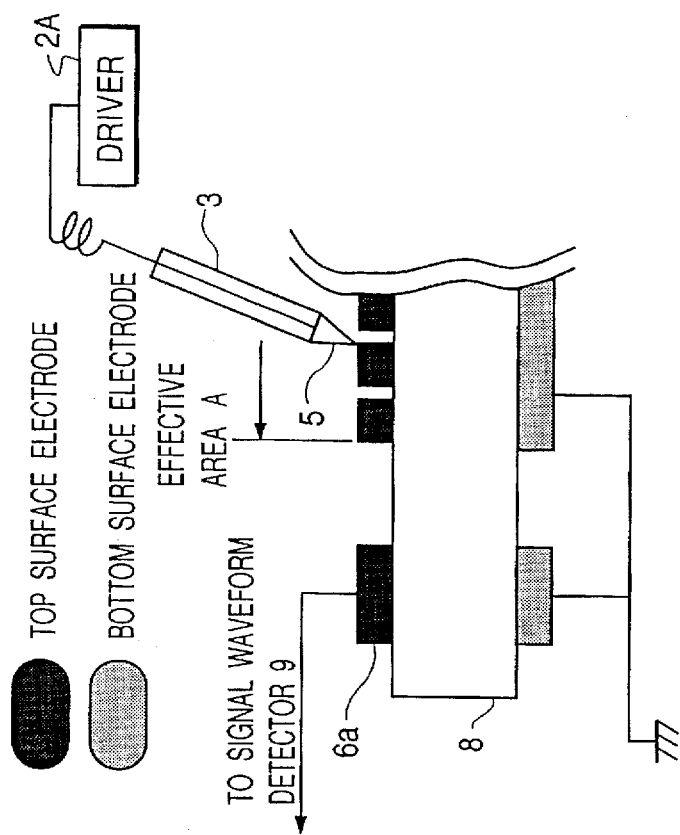
FIG. 2B is a perspective view seen from the direction of an arrow A1 in FIG. 2A.
Figure 2A:
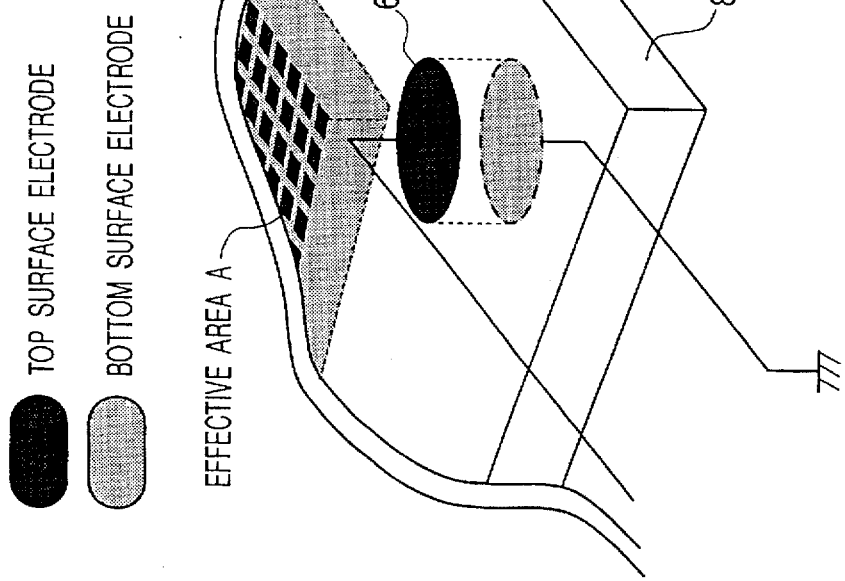
FIG. 2A is an external perspective view showing a first construction of a part of a vibration propagating plate 8.

FIG. 2A is an external perspective view showing a first construction of a part of the vibration propagating plate 8. FIG. 2B is a perspective view when it is seen from the direction of an arrow A1 in FIG. 2A.

In the effective area A in which the coordinates can be inputted in FIG. 2A, electrodes are uniformly arranged on the bottom surface of the vibration propagating plate 8 and are connected to the ground. On the other hand, mesh-like electrodes are formed on the top surface (coordinate input surface) as a surface opposite to the bottom surface. When the contact 5 of the input pen 3 comes into contact with one of the top electrodes, a voltage as a drive signal to drive the vibration propagating plate 8 in the thickness direction of the vibration propagating plate 8 is supplied from the driver 2A. The vibration propagating plate 8 starts to vibrate at the contact position. The generated vibration propagates on the vibration propagating plate 8 like a wave pattern which is generated when a stone is dropped onto a water surface.

The vibration propagated on the vibration propagating plate 8 soon reaches the four corners of the plate 8. As for the vibration detecting electrodes 6a to 6d provided at the four corners of the vibration propagating plate 8, the electrodes which are connected to the ground are fixed to the opposite surfaces.

The electrodes which are arranged on the vibration propagating plate 8 are formed by a method such that electrodes (electrodes which are formed uniformly on the top and bottom surfaces of the vibration propagating plate 8) formed to polarize a piezoelectric material in the thickness direction are previously formed in a shape as shown in the diagram by an etching or the like or a method such that after the electrodes were formed in a shape as shown in the diagram by a printing or the like, the piezoelectric material is polarized by using those electrodes as electrodes for polarization, and the vibration propagating plate 8 is formed. The structure of the electrode is not limited to that shown in FIGS. 2A and 2B. For example, it is also possible to uniformly form the electrode on the bottom surface and to form only the electrodes on the top surface (coordinate input surface) by an etching or the like as shown in FIGS. 3A and 3B.

FIG. 3A is an external perspective view showing a second construction of a part of the vibration propagating plate 8. FIG. 3B is a perspective view when it is seen from the direction of an arrow B in FIG. 3A.

As shown in FIGS. 3A and 3B, by using the whole bottom surface as an electrode, the influence can be eliminated against the electric noises. As compared with the construction of FIGS. 2A and 2B, a process for positioning the electrodes on the top and bottom surfaces and the like are unnecessary and the apparatus can be also relatively cheaply manufactured. Further, the positions of the vibration propagating electrodes 6 are not limited to the corners of the vibration detecting plate 8 but can be also properly set every vibration propagating plate 8. The number of vibration detecting electrodes is also not limited to 4 but it is also possible to use a structure such that at least two or more vibration detecting electrodes are fixed. Further, it is also possible to use an electrode arrangement as shown in, for example, FIGS. 4A and 4B.

Figure 4B:
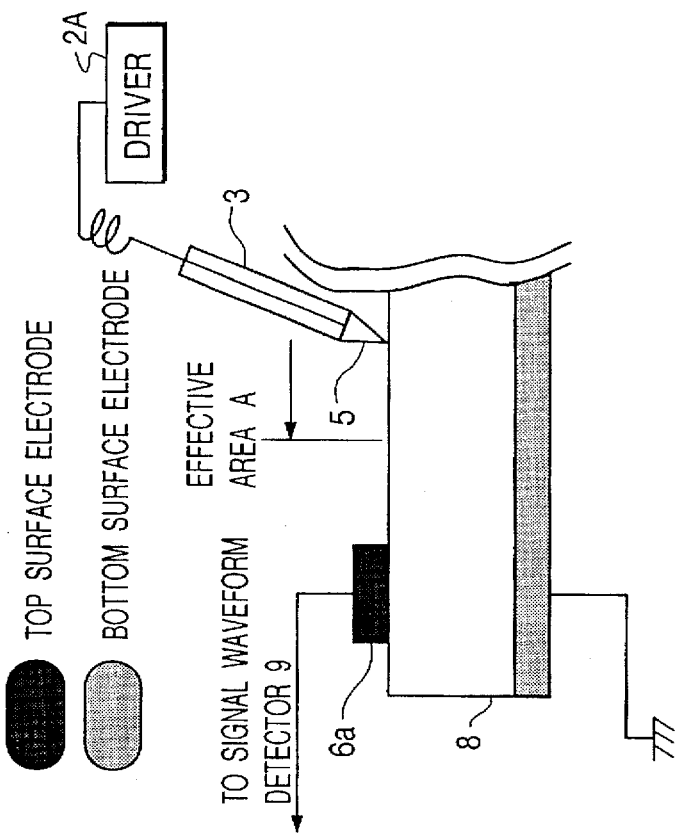
FIG. 4B is a perspective view seen from the direction of an arrow C in FIG. 4A.
Figure 4A:
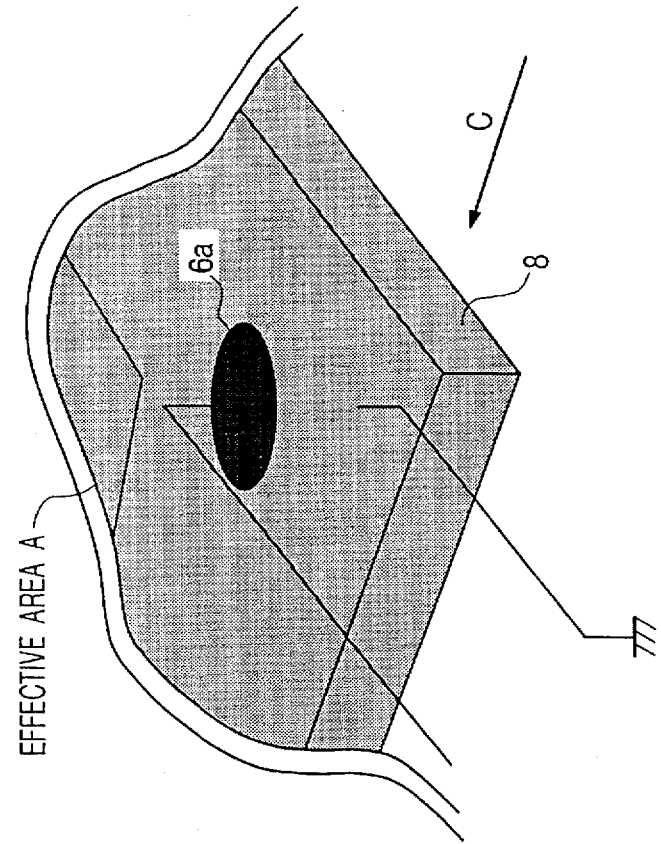
FIG. 4A is an external perspective view showing a third construction of a part of the vibration propagating plate 8.

FIG. 4A is an external perspective view showing a third construction of a part of the vibration propagating plate 8.

FIG. 4B is a perspective view when it is seen from the direction of an arrow C in FIG. 4A.

As shown in FIGS. 4A and 4B, even if no electrode is formed on the contact surface in the effective area A, so long as an enough voltage can be applied by making the input pen 3 come into contact with the plate 8, a vibration is generated in the plate thickness direction, so that coordinates can be detected. Although the vibration propagating plate 8 has been constructed by PZT in the embodiment, the invention is not limited to such a material but can also use another material having a piezoelectric performance such as ZnO, PLZT, PVDF, or the like. Although FIGS. 2A to 4B show the constructions in which the bottom surface (side opposite to the coordinate input surface) of the vibration propagating plate 8 is connected to the ground and the voltage is applied from the input pen 3, the invention is not limited to such constructions. For example, it is also possible to use an electrode arrangement as shown in FIGS. 5A and 5B.

FIG. 5A is an external perspective view showing a fourth construction of a part of the vibration propagating plate 8. FIG. 5B is a perspective view when it is seen from the direction of an arrow D in FIG. 5A.

FIGS. 5A and 5B show the construction such that the drive signal for driving the vibration propagating plate 8 from the bottom surface side is supplied from the driver 2A. When the input pen 3 comes into contact with the vibration propagating plate 8, a voltage is applied to the vibration propagating plate 8 and a vibration is generated. In this instance, although the electrode on the bottom surface side which faces the vibration detecting electrode 6a on the top surface is connected to the ground, the invention is not limited to such a structure. For example, it will be obviously understood that it is also possible to use a construction such that the vibration detecting electrode 6a is fixed to the bottom surface side. When the vibration detecting electrode is fixed to the bottom surface side, a state such that the electrodes in the effective area A and the vibration detecting electrodes are not electrically connected as shown in FIGS. 5A and 5B are preferable. This is because if the vibration detecting electrode is included in the electrodes to be arranged uniformly on the bottom surface side, the drive signal that is supplied from the driver 2A also causes a vibration even at the position of the vibration detecting electrode and the coordinates cannot be correctly detected.

<Explanation of the controller>

Figure 6:
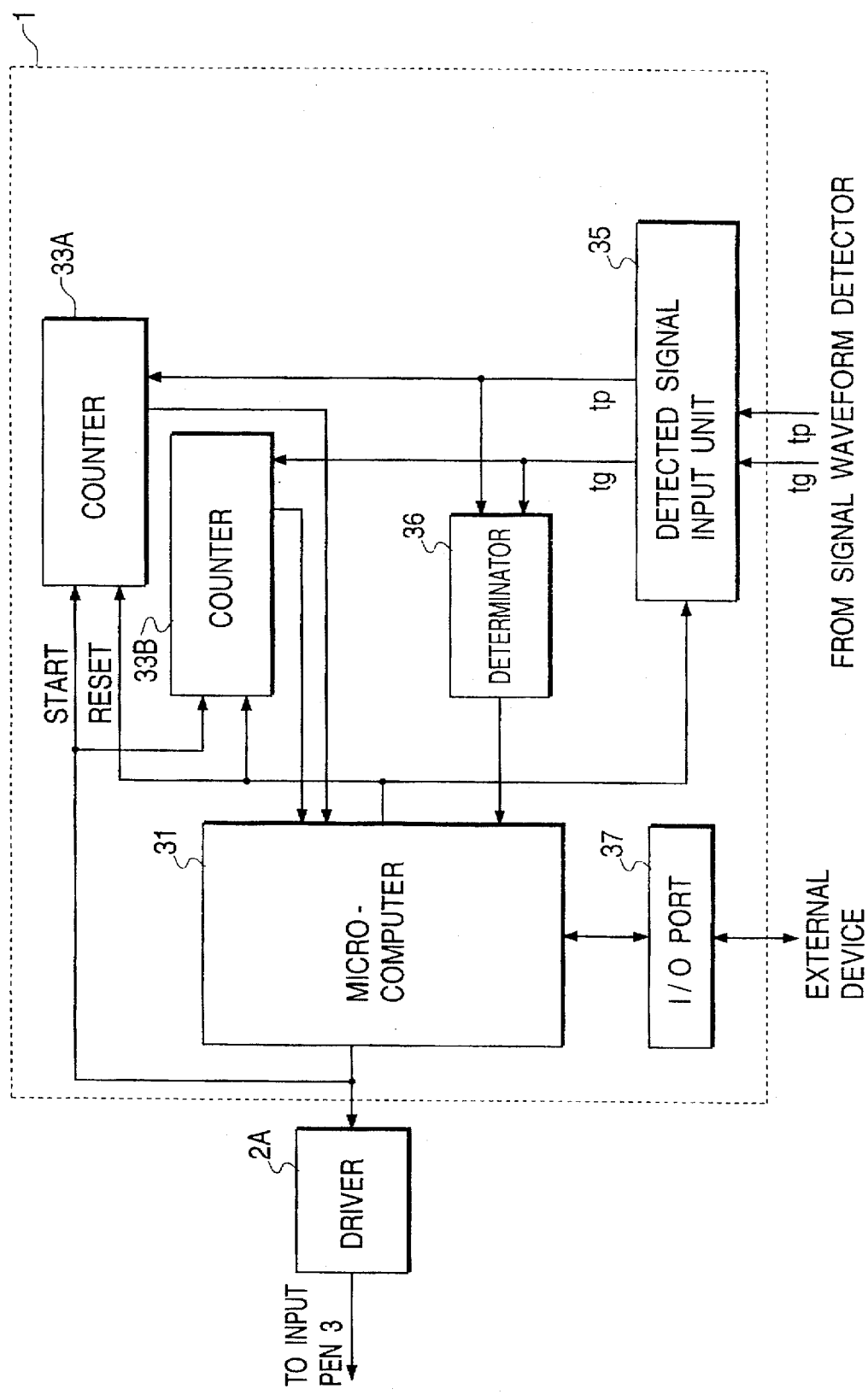
FIG. 6 is a block diagram showing a detailed construction of a controller 1 in the embodiment.

FIG. 6 is a block diagram showing a detailed construction of the controller 1 of the embodiment.

In the diagram, reference numeral 31 denotes a microcomputer for controlling the controller 1 and the whole coordinates input apparatus. The microcomputer 31 is constructed by: an internal counter (not shown); an ROM (not shown) in which operating procedures have been stored; an RAM (not shown) which is used as a data work area or a temporary shunt area when coordinates are calculated; a non-volatile memory (not shown) for storing constants (for example, constants such as frequency f, phase velocity Vp, group velocity Vg, and the like, which will be explained hereinlater, regarding a sound velocity of the wave) which are necessary to calculate the distance; and the like.

Reference numerals 33a and 33b denote counters for counting reference clocks. When a start signal for generating a drive pulse to the contact 5 is inputted to the driver 2A, for example, the counter 33a to count a phase delay time tp which is calculated on the basis of a detection waveform that is detected by the vibration detecting electrode 6a and the counter 33b to count a group delay time tg start the time counting operations. Thus, the timing to start the time counting operation and the timing to generate the vibration of the input pen 3 are synchronized. A delay time until the vibration is detected by the electrode can be measured. In FIG. 6, although only one set of the counters 33a and 33b for the vibration detecting electrode 6a has been shown, when the vibration detecting electrodes 6a to 6d are arranged at four positions as shown in the embodiment, four counters corresponding to the four vibration detecting electrodes 6a to 6d exist. It is also possible to construct in a manner such that the detection signals from the electrodes 6a to 6d are time-sequentially divided by the signal waveform detector 9, which will be explained hereinlater, and to detect the times necessary for calculation of the coordinates. Namely, the apparatus is constructed so as to process the signal from another vibration detecting electrode every vibration that is generated from the position which is instructed by the input pen 3. For example, when two signals from the vibration detecting electrodes are necessary to calculate the coordinates, the coordinates can be calculated only when the vibration is generated twice from the position instructed by the input pen 3.

As for a vibration arrival timing signal from the vibration detecting electrode 6a which is outputted from the signal waveform detector 9, an arrival timing signal of the phase delay time tp regarding the phase velocity Vp of the Lamb wave and an arrival timing signal of the group delay time tg regarding the group velocity Vg are inputted to the counters 33a and 33b through a detected signal input unit 35, respectively. When the timing signals are received from the vibration detecting electrode 6a, the counters 33a and 33b are stopped and count values at that time are latched. A determinator 36 decides that those timing signals were generated. When receiving a determination signal from the determinator 36, the microcomputer 31 reads out the vibration propagation times from the counters 33a and 33b and executes a predetermined calculation. On the basis of the calculation result, the distance between the input pen 3 of the vibration propagating plate 8 and the vibration detecting electrode 6a and the coordinates of the position of the input point are calculated. From the calculation results, the microcomputer outputs the coordinate information to an external information device or the like through an I/O port 37. When coordinates are newly inputted, the microcomputer 31 outputs reset signals to the counters 33a and 33b and clears the contents in the counters 33a and 33b to zero.

<Explanation of detection of vibration propagation times (FIGS. 7 and 8)>

Explanation will now be made with respect to a principle such that the vibration propagation times on the vibration propagating plate 8, namely, the times which are required until the vibration sensors 6a to 6d detect the vibration which is generated by making the input pen 3 come into contact with the coordinate input surface.

Figure 7:
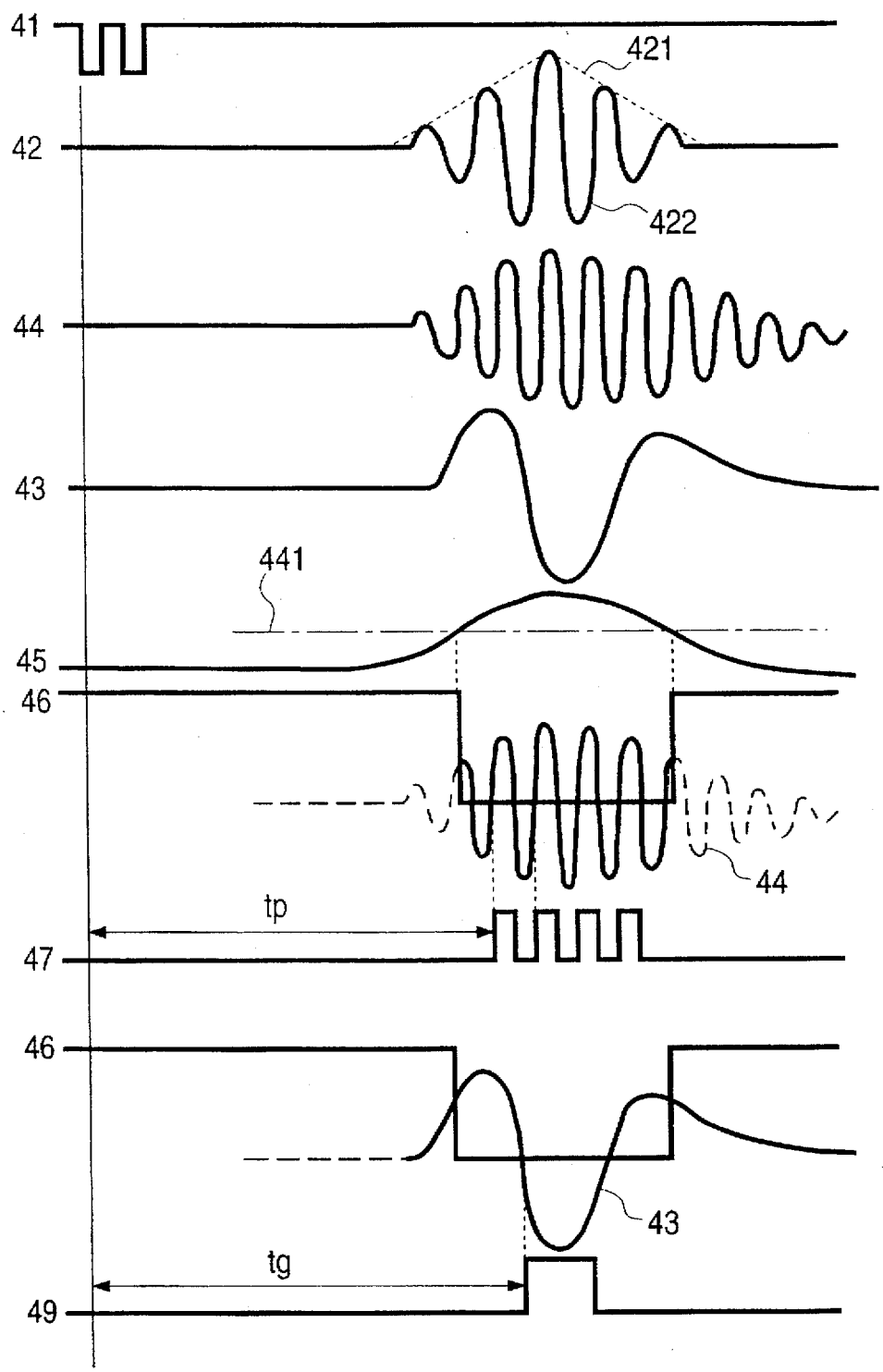
FIG. 7 is a diagram for showing detected waveforms which are inputted to a signal waveform detector 9 in the embodiment and for explaining a measuring process of a vibration propagation time based on the detected waveforms.

FIG. 7 is a diagram for explaining detected waveforms which are inputted to the signal waveform detector 9 and a process for measuring the vibration propagation times based on the detected waveforms in the embodiment.

Among the vibration detecting electrodes 6a to 6d, the electrode 6a will now be described as an example. Explanation about the remaining electrodes 6b to 6d are omitted because it is similar to the explanation about the electrode 6a.

The measurement of the vibration propagation time to the vibration detecting electrode 6a is started simultaneously with the output of the start signal to the vibrator driver 2A. In this instance, a drive signal 41 is applied from the driver 2A to the contact 5. When the contact 5 comes into contact with the vibration propagating plate 8, the signal 41 allows the vibration propagating plate 8 to generate a vibration. The vibration propagates with a time corresponding to the distance to the vibration propagating electrode 6a. After that, the vibration is detected by the vibration detecting electrode 6a. A signal 42 in the diagram shows a signal waveform detected by the vibration detecting electrode 6a.

Since the vibration which is used in the embodiment is the Lamb wave as mentioned above, a velocity (group velocity Vg) at which an envelope 421 of the detected waveform propagates and a velocity (phase velocity Vp) at which a phase 422 propagates are different. Therefore, for the propagation distance in the vibration propagating plate 8, the relation between the envelope 421 of the detected waveform and phase 422 changes in accordance with the propagation distance during the propagation of the vibration. In the embodiment, the distance between the input pen 3 and vibration detecting electrode 6a is detected from the group delay time tg based on the group velocity Vg and the phase delay time tp based on the phase velocity Vp.

Figure 8:
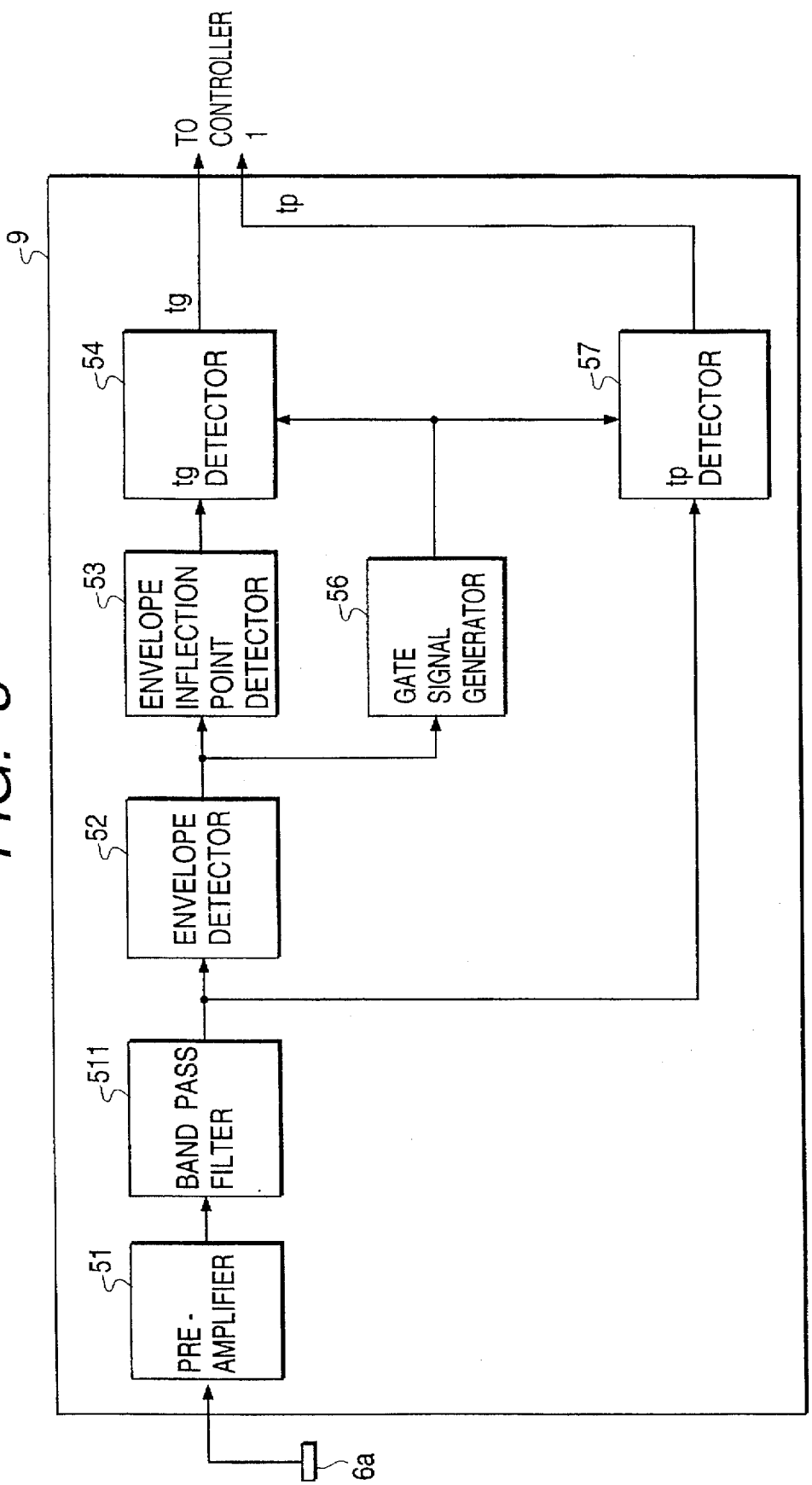
FIG. 8 is a block diagram showing a detailed construction of the signal waveform detector 9 in the embodiment.

FIG. 8 is a block diagram showing a detailed construction of the signal waveform detector 9 in the embodiment.

In the diagram, although the signal waveform detector 9 for the vibration detecting electrode 6a is shown, four signal waveform detectors actually exist in correspondence to the vibration detecting electrodes 6a to 6d.

A method of detecting the group delay time tg and phase delay time tp will now be explained also with reference to FIG. 7.

The output signal 42 of the vibration detecting electrode 6a is amplified up to a predetermined level by a pre-amplifier 51. The amplified signal is supplied to a band pass filter 511 and surplus frequency components in the detection signal are eliminated by the BPF 511, thereby obtaining a signal 44. When paying attention to an envelope of the signal 44, a sound velocity at which the waveform propagates is the group velocity Vg. When a point on a certain specific waveform, for example, a peak of the envelope or an inflection point of the envelope is detected, the delay time tg regarding the group velocity Vg is derived.

The signal 44 is inputted to an envelope detector 52 constructed by, for example, an absolute value circuit, a low pass filter, and the like and only an envelope signal 45 in the detection signal is extracted. A gate signal generator 56 constructed by a multivibrator or the like forms a gate signal 46 which gives a predetermined period after the level exceeded a predetermined threshold level 441 for the extracted envelope signal 45.

To detect the group delay time tg regarding the group velocity Vg, it is sufficient to detect the peak, inflection point, or the like of the envelope as mentioned above. In case of the embodiment, however, the first inflection point (trailing zero-cross point of the signal 43, which will be explained hereinlater) of the envelope is detected. The envelope signal 45 outputted by the envelope detector 52 is inputted to the envelope inflection point detector 53, so that a double differentiated waveform signal 43 of the envelope is obtained. The double differentiated waveform signal 43 is masked by the gate signal 46 by a tg detector 54 constructed by a multivibrator or the like and a tg signal 49 as an envelope delay time detection signal of a predetermined waveform is formed and supplied to the controller 1. A time from the trailing edge of the signal 41 to the leading edge of the tg signal 49 is set to tg.

As for the phase delay time tp regarding the phase velocity Vp, a zero-cross point (first point when the phase changes from negative to positive) of the first leading edge of the phase signal 44 is detected by a tp detector 57 constructed by a zero-cross comparator, a multivibrator, or the like for detecting the phase delay time tp. Further, the phase signal 44 is masked by the gate signal 46 and a tp signal 47 as a phase delay time detection signal is formed and supplied to the controller 1. A time from the trailing edge of the signal 41 to the leading edge of the tp signal 47 is set to tp.

<Explanation of calculation of distance between the input pen and the electrode (FIG. 9)>

A method of respectively calculating the distance between the input pen and each electrode from the group delay time tg and phase delay time tp obtained as mentioned above will now be described.

Figure 9:
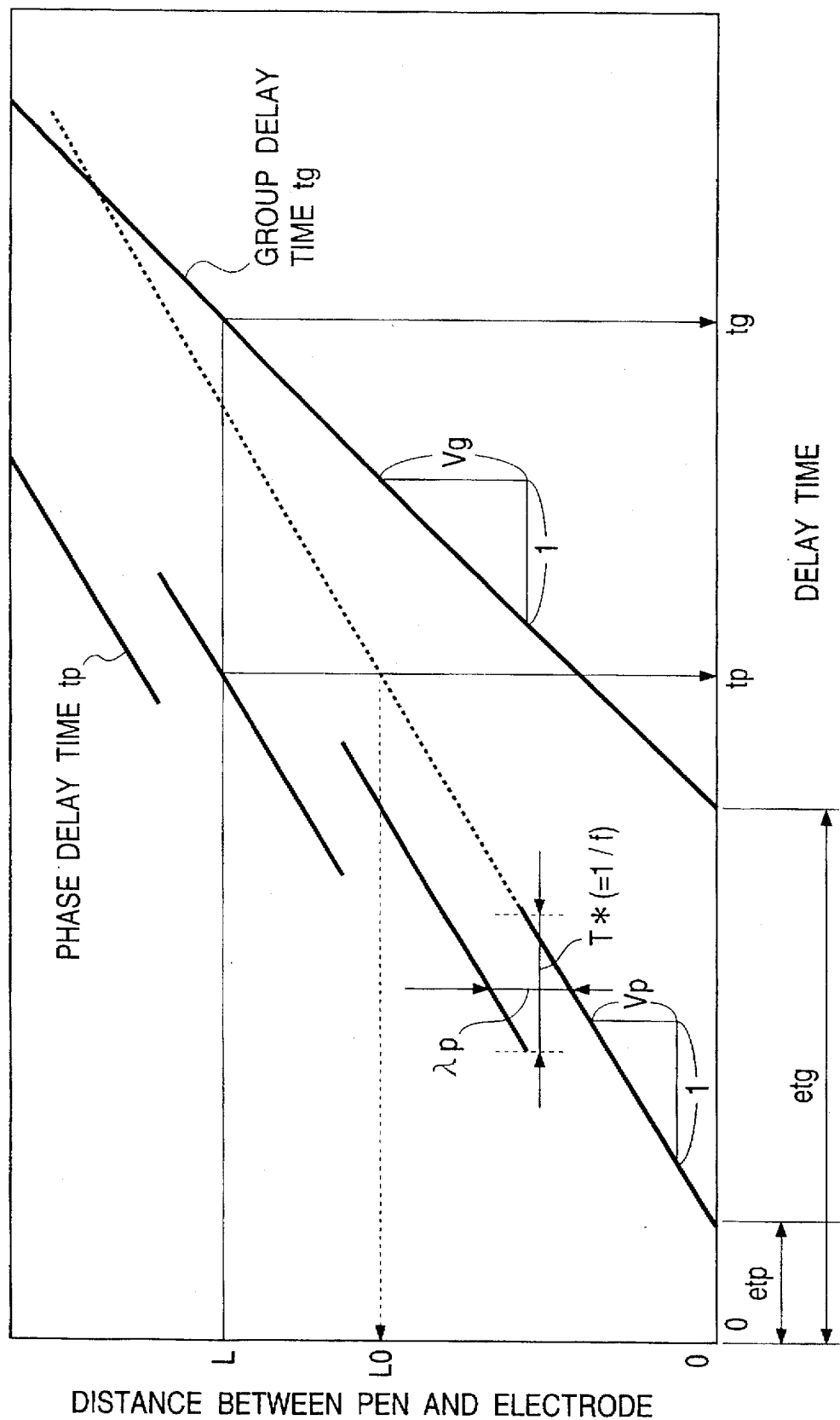
FIG. 9 schematically shows the relations among a group delay time tg, a phase delay time tp, and a distance L between an input pen and an electrode for detecting a vibration in the embodiment.

FIG. 9 schematically shows the relations among the group delay time tg and phase delay time tp and the distance L between the input pen and the vibration detecting electrode in the embodiment.

Although the relation between the group delay time tg and distance L is continuous, it doesn't have an excellent linearity. On the other hand, it is not continuous. Such a discontinuity occurs due to a nature of the Lamb wave in which the group velocity Vg and phase velocity Vp differ.

The sound velocity of wave (group velocity Vg, phase velocity Vp) is obtained by those relations and is defined as follows. The group velocity Vg is defined as a velocity in which its inclination is obtained by a method of least squares of the first degree due to the relation between the group delay time tp and distance L. The phase velocity Vp is defined as a velocity in which inclinations of individual straight lines are obtained by a method of least squares of the first degree and values of a plurality of inclinations obtained in a measured distance range are averaged and a mean value is set to such a velocity. Further, as for the frequency f of the Lamb wave, a segment of each straight line of the phase delay time tp is obtained by a method of least squares of the first degree by using the phase velocity Vp defined before and an interval between the straight lines is obtained. A mean value obtained by averaging the values of a plurality of intervals obtained in the measured distance range is defined as a wavelength $\lambda$. The frequency f is defined as (phase velocity Vp/wavelength $\lambda$). It will be understood that a highest distance measurement precision is derived by calculating the distance by a method, which will be explained hereinlater, by using the phase velocity Vp, group velocity Vg, and frequency f which were defined as mentioned above.

A distance calculating algorithm will now be specifically explained. In the embodiment, the Lamb wave is used as a detected wave and the linearity of the relation between the group delay time tg and distance L which are outputted is not so good. Therefore, when the distance L between the input pen 3 and vibration detecting electrode 6 is obtained as a product of the group delay time tg and group velocity Vg as shown by the following equation (1), the distance L cannot be accurately obtained.

$$L = Vg \cdot tg \tag{1}$$

Therefore, in order to determine the coordinates at a high precision, an arithmetic operating process is executed by the following equation (2) on the basis of the phase delay time tp with an excellent linearity.

$$L = Vp \cdot tp + N \cdot \lambda p \tag{2}$$

where, $\lambda p$ is a wavelength of an elastic wave and N is an integer.

That is, the first term of the right side of the equation (2) shows a distance L0 in FIG. 9. As will be obviously understood from the diagram, a difference between the distance L to be obtained and distance L0 is integer times as large as the wavelength [a width T* on a time base is equal to one period of the signal waveform 44, so that T*=1/frequency (f); if the width is expressed by a distance, it is equal to the wavelength λp]. Consequently, by obtaining the integer N, the distance L between the input pen and the vibration detecting electrode can be accurately obtained. Therefore, the integer N can be obtained by the following equation (3) from the above equations (1) and (2).

$$N=INT[(Vg \cdot tg - Vp \cdot tp)/\lambda p + 0.5] \quad (3)$$

The equation (3) shows that even if the linearity of the relation between the group delay time tg and the distance is improved, so long as an error which occurs due to it lies within a range of ±½ wavelength, N can be accurately determined. By substituting the value of N obtained as mentioned above into the equation (2), the distance L between the input pen 3 and vibration detecting electrode 6 can be accurately set.

The vibration propagation time which is outputted by the signal waveform detector 9 includes a phase circuit delay time etp and a group circuit delay time etg. The same amount is certainly included in each of the errors which occur due to those delay times in the series of operations which are executed in a range from the input pen 3 to the vibration propagating plate 8, vibration detecting electrode 6a, and signal process.

Therefore, for example, in FIG. 10, assuming that vibration propagation times which are actually measured by a well-known distance (hereinafter, such a well-known distance is defined as Ra and an origin is defined as 0 hereinafter) from the vibration detecting electrode 6a are set to tg0* and tp0* and propagation times which are required until the wave actually propagates on the propagating plate from the origin 0 to the electrode are set to tg0 and tp0, there are the following relations.

$$tg0^* = tg0 + etg \quad (4)$$

$$tp0^* = tp0 + etp \quad (5)$$

On the other hand, actual measured values tg* and tp* at an arbitrary input point P are similarly $$tg^* = tg + etg \quad (6)$$

$$tp^* = tp + etp \quad (7)$$

When obtaining a difference between the equations (4) and (6) and a difference between the equations (5) and (7), respectively, $$tg^* - tg0^* = (tg + etg) - (tg0 + etg) = tg - tg0 \quad (8)$$

$$tp^* - tp0^* = (tp + etp) - (tp0 + etp) = tp - tp0 \quad (9)$$

The phase circuit delay time etp and group circuit delay time etg included in the propagation times are eliminated and the true propagation time delays when the wave propagates on the vibration propagating plate can be obtained, respectively. Therefore, by setting $$tg = tg^* - tg0^* \quad (10)$$

$$tp = tp^* - tp0 \quad (11)$$

calculating the distance by using the equations (1), (2), and (3), and lastly adding the distance Ra between the vibration detecting electrode 6a and origin 0 to the value of the calculated distance, the distance between the input pen 3 and vibration detecting electrode 6a can be accurately obtained. Namely, it will be understood that if the distance between the vibration detecting electrode 6a and origin 0 and the vibration propagation times tg0* and tp0* which are measured at that time point are previously stored into a non-volatile memory or the like, the distance between the input pen 3 and vibration detecting electrode 6 can be accurately determined.

Although the embodiment has been described with respect to the Lamb wave, it will be obviously understood that when selecting another vibrating mode, namely, when selecting a vibrating mode such that the relation between the group delay time tg and distance L has an excellent linearity, the distance can be also obtained by the product of the group delay time tg and group velocity Vg as shown in the equation (1).

<Explanation of calculation of the coordinate position (FIG. 10)>

A principle for actually detecting the coordinate position on the vibration propagating plate 8 by the input pen 3 will now be described.

Figure 10:
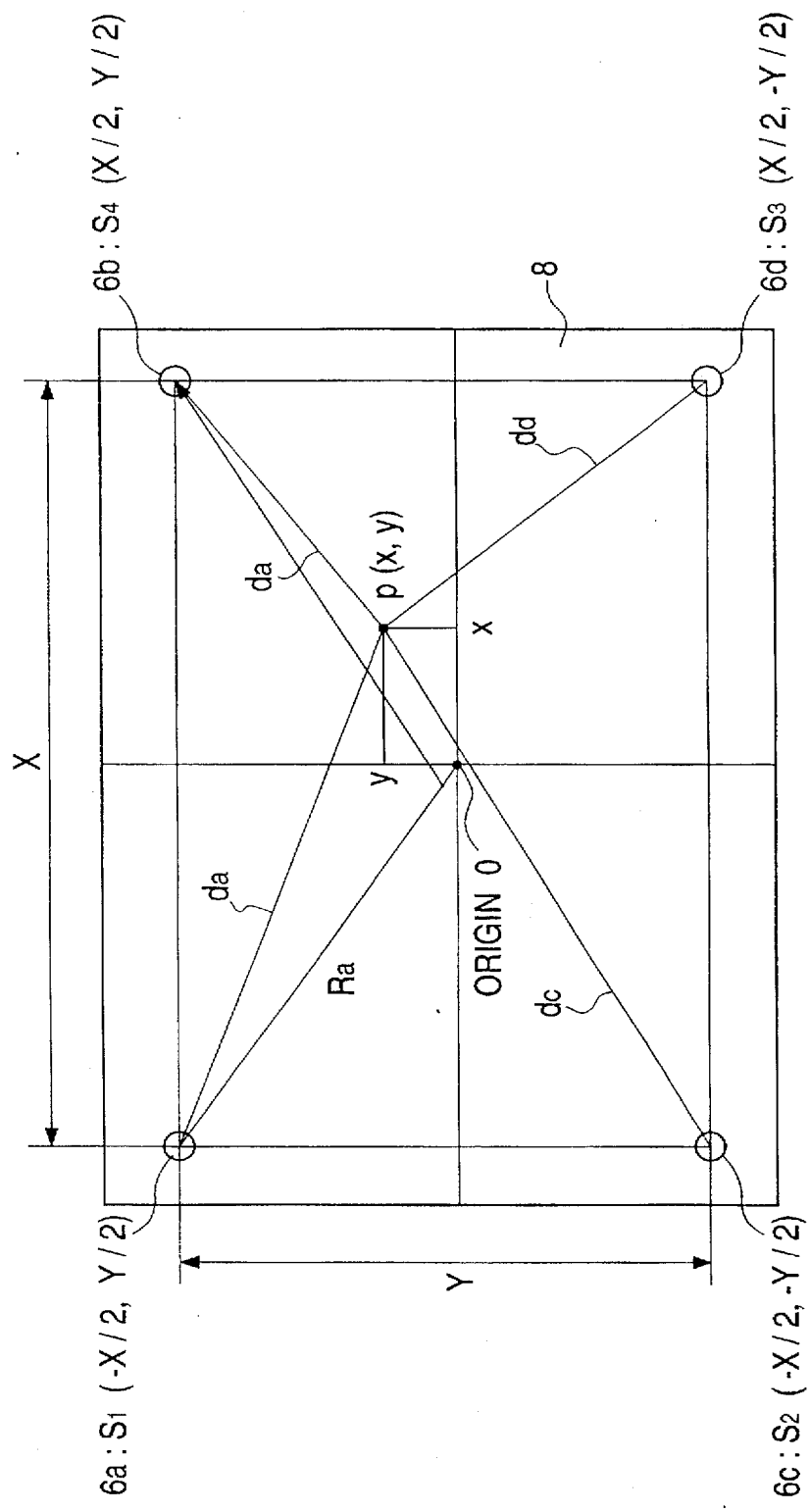
FIG. 10 is a diagram for explaining a method of calculating a coordinate position by the coordinates input apparatus of the embodiment.
Figure 11:
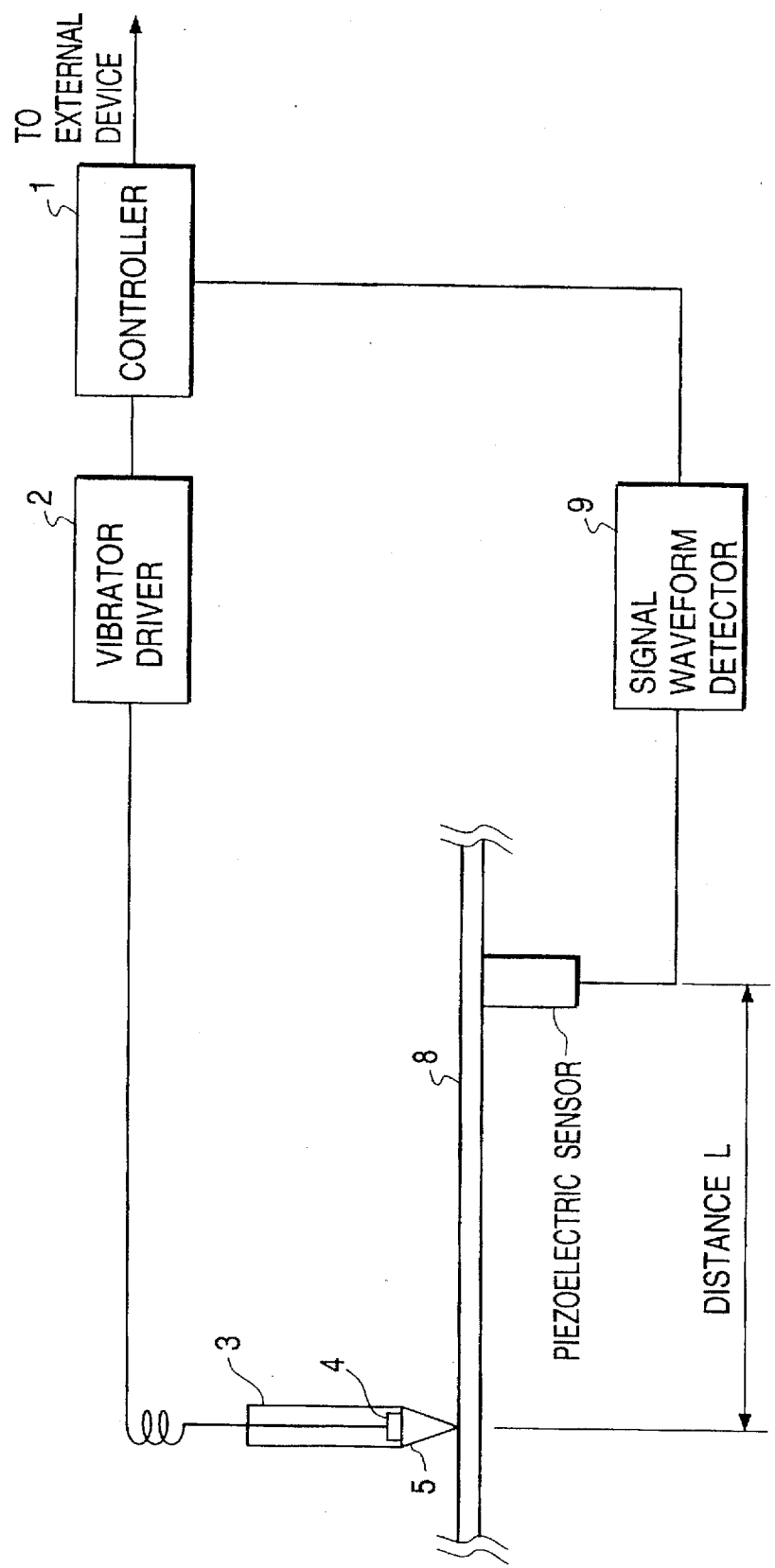
FIG. 11 is a block diagram showing a construction of a conventional coordinates input apparatus.

FIG. 10 is a diagram for explaining a method of calculating the coordinate position by the coordinates input apparatus according to the embodiment.

As shown in FIG. 10, when the effective area A on the vibration propagating plate 8 is set to XY coordinates in which the origin 0 is set to the center and the four vibration detecting electrodes 6a to 6d are fixed to coordinates S1 to S4 at four corners of the effective area A, straight line distances da to dd from the position P of the input pen 3 to the positions of the vibration detecting electrodes 6a to 6d can be obtained on the basis of the above-described principle, respectively. Further, coordinates (x, y) of the position P of the input pen 3 can be obtained by the controller 1 from a theorem of three squares on the basis of the straight line distances da to dd as shown in the following equations (12) and (13).

The distance between the vibration detecting electrodes 6a and 6b is set to X and the distance between the vibration detecting electrodes 6a and 6c is set to Y.

$$x = (da + db) \cdot (da - db)/2X \quad (12)$$

$$y = (da + dc) \cdot (da - dc)/2Y \quad (13)$$

As mentioned above, the coordinates of the position instructed by the input pen 3 can be detected in a real-time manner.

The coordinates have been calculated by using the distance information between the position instructed by the input pen 3 and the three vibration detecting electrodes 6a to 6c in the above example. In the embodiment, however, since the electrodes are arranged at four positions, a precision of the output coordinates is verified by using the distance information of the remaining one electrode. As a verifying method, for instance, the coordinates are calculated by using another combination of the vibration detecting electrodes 6b to 6d, the calculation results are compared, and the precision of the coordinate positions can be confirmed.

Further, in accordance with an application, for example, it is also possible to construct in a manner such that the distance information of the vibration detecting electrode in which the distance L between the input pen and the vibration detecting electrode is largest (when the distance L increases, the detected signal level decreases and a probability at which the information is influenced by the noises increases) is not used but the coordinates are calculated by using the distance information of the remaining three or two electrodes (although calculating equations are not shown, a construction using the two electrodes is possible in principle). In this case, the effective area where the coordinates can be inputted can be also enlarged. With respect to the number of vibration detecting electrodes, the coordinates can be geometrically calculated by using the vibration detecting electrodes arranged at two or more positions. It will be obviously understood that the installing positions of the vibration detecting electrodes are set in accordance with the specifications of products.

According to the embodiment as described above, the material having the piezoelectric performance is used as a vibration propagating plate and the voltage is applied from the input pen, thereby vibrating the vibration propagating plate, and the vibration can be detected as an electric signal at the electrode position. Therefore, a thickness of apparatus can be made thin as compared with the construction using the piezoelectric devices such as vibration sensors or the like according to the conventional method. Since there is no need to vibrate the input pen itself, a structure of input pen can be simplified and a mass productivity is improved. Further, in the coordinates input apparatus for calculating the coordinates by calculating the distances between the vibration input source and the vibration detecting points by using the vibration, since a positioning precision of the detecting device for detecting the vibration directly exerts an adverse influence on the coordinate calculating precision, it is necessary to strictly manage the position accuracies of the fixing position of the detecting device. According to the invention, however, since the accurate positioning process is unnecessary, the management of the position accuracy is easier than the conventional one. Thus, the coordinates input apparatus having an excellent mass productivity and a high performance can be constructed at low costs.

The invention can be applied to a system constructed by a plurality of equipment such as host computer, interface, printer, and the like or can be also applied to an apparatus comprising one equipment. It will be obviously understood that the invention can be also applied to the case where the invention is embodied by supplying a program to a system or an apparatus. In this case, a memory medium in which programs regarding the invention have been stored constructs the invention. By reading out the programs from the memory medium and supplying to a system or an apparatus, the system or apparatus operates by a predetermined method.

As will be obviously understood from the above description, according to the invention, the portable coordinates input apparatus which can be manufactured at low costs can be provided.

What is claimed is:

1. A coordinates input apparatus for inputting coordinates by an input pen, comprising:

a vibration propagating plate which has a piezoelectric performance and has a first surface including a coordinate input area and a second surface that faces said first surface;

applying means for applying a voltage to said vibration propagating plate by making said input pen come into contact with a desired position in said coordinate input area; and detecting means for detecting a vibration which ms generated by said voltage as an electric signal at a position of an electrode arranged out of said coordinate input area, wherein said coordinate input area has a mesh-like electrode.

2. An apparatus according to claim 1, further comprising:

first calculating means for calculating a time which is required until the vibration arrives at each of said detecting means;

second calculating means for calculating the position at which said input pen comes into contact on the basis of each time that is calculated by said first calculating means; and output means for outputting the position that is calculated by said second calculating means.

3. An apparatus according to claim 1, wherein said input pen is connected to the ground.

4. An apparatus according to claim 1, wherein said second surface has at least an electrode of a same size as that of said coordinate input area at a position which faces said coordinate input area.

5. An apparatus according to claim 4, wherein the electrode of said second surface is connected to the ground.

6. An apparatus according to claim 1, wherein said vibration propagating plate is a vibration propagating plate made of piezoelectric ceramics.

7. An apparatus according to claim 1, wherein said vibration propagating plate includes at least any one of PZT, ZnO, PLZT, and PVDF.

* * * * *

UNITED STATES PATENT AND TRADEMARK OFFICE
CERTIFICATE OF CORRECTION

PATENT NO. : 5,744,760
DATED : April 28, 1998
INVENTOR(S) : KATSUYUKI KOBAYASHI, ET AL.

It is certified that error appears in the above-identified patent and that said Letters Patent is hereby corrected as shown below:

Column 3

Line 46, "was" should read --is--.
    Line 54, "and arrives" should be deleted.

Column 4

Line 36, "were" should read --are--.
    Line 37, "a" should be deleted.

Column 5

Line 4, "an enough" should read --a sufficient--.
    Line 8, "by" should read --with--.
    Line 39, "are" should read --is--.
    Line 51, "an" should read --a--.
    Line 52, "an" should read --a--.

UNITED STATES PATENT AND TRADEMARK OFFICE
CERTIFICATE OF CORRECTION

PATENT NO. : 5,744,760
DATED : April 28, 1998
INVENTOR(S) : KATSUYUKI KOBAYASHI, ET AL.

It is certified that error appears in the above-identified patent and that said Letters Patent is hereby corrected as shown below:

<u>Column 5</u>

Line 63, "counter 33a to count" should read --counter 33a starts to count--.
    Line 66, counter 33b to count" should read --counter 33b starts to count"--; and "start the time" should be deleted.
    Line 67, "counting operations" should be deleted.

<u>Column 6</u>

Line 15, "every" should read --for every--.

<u>Column 12</u>

Line 16, "ms" should read --is--.

Signed and Sealed this

Twenty-fourth Day of November, 1998

Attest:

BRUCE LEHMAN

*Attesting Officer*    Commissioner of Patents and Trademarks